May 22, 1956     A. C. JERMYN     2,746,148
MASTICATORS FOR ARTIFICIAL TEETH
Filed Oct. 11, 1954
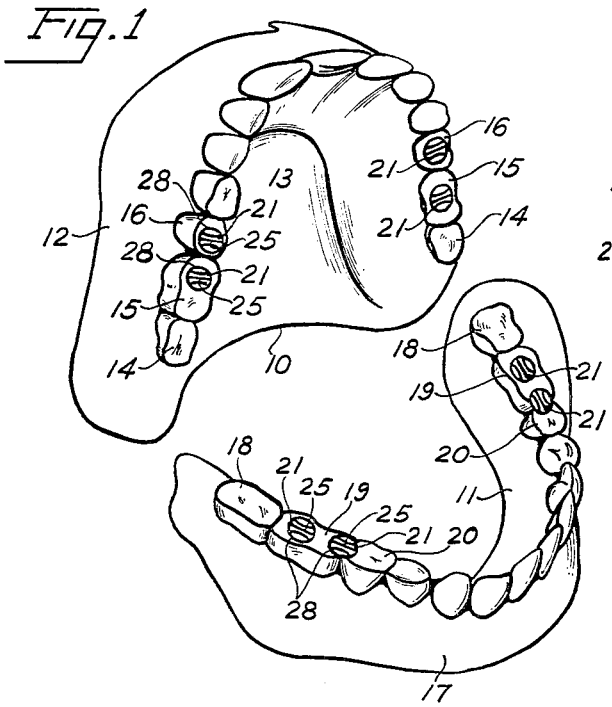
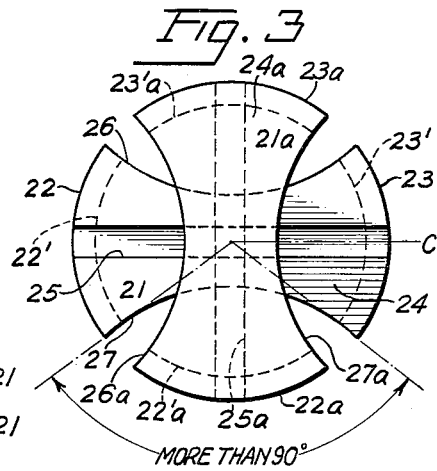
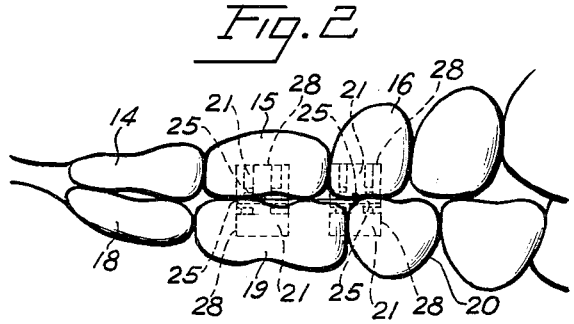
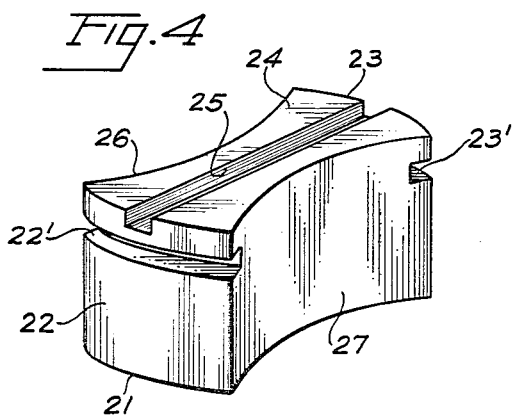
INVENTOR.
ARTHUR C. JERMYN
BY George A. Gillette Jr.
ATTORNEY.

United States Patent Office 2,746,148
Patented May 22, 1956

2,746,148
MASTICATORS FOR ARTIFICIAL TEETH

Arthur C. Jermyn, Rochester, N. Y.

Application October 11, 1954, Serial No. 461,451

8 Claims. (Cl. 32—2)

The present invention relates to dental masticators and more particularly to dental masticators inserted into, and for insertion into, artificial teeth.

It is well known that plastic artificial teeth are subject to considerable wear, particularly at the occluding surfaces thereof, so that their effectiveness soon becomes impaired and the vertical dimension of the alveolar arches may be changed. Various types and forms of dental masticators have been proposed but they all have one or more shortcomings in that they have to be processed into the teeth before the denture is made, may create an unsanitary condition by trapping food, and/or may cause checking of the teeth.

The primary object of the present invention is the provision of dental masticators for artificial teeth that eliminate wear on the occluding surfaces of the teeth, provided highly efficient masticating action, and are readily inserted after dentures have been balanced.

Other objects of the invention will be apparent to those skilled in the art from the disclosure which follows.

Reference is hereby made to the accompanying drawing wherein like reference numerals designate similar elements and wherein:

Fig. 1 is a front view of a set of artificial teeth in open position and equipped with dental masticators according to the invention.

Fig. 2 is a fragmentary side elevation of the molars and bicuspids of the right side of a set of teeth and showing in dotted lines the masticators of the invention.

Fig. 3 is a top view to enlarged scale of a pair of masticators according to the invention showing the relative positions of the grooves therein and edges thereof when the teeth containing the masticators are in closed or grinding position.

Fig. 4 is a perspective view to enlarged scale of a single dental masticator of the invention.

In the illustrated embodiment of the invention, a set of artificial teeth is composed of an upper plate 10 and a lower plate 11. The upper plate 10 includes a gum portion 12 and a palate 13 simulating the corresponding natural parts of the mouth, and has a series of teeth including molars 14 and 15 and bicuspids 16. Similarly, the lower plate 11 includes a gum portion 17 and a series of teeth including molars 18 and 19 and bicuspids 20.

The individual masticators, see Fig. 4, are preferably made from cylindrical or rod stock of stainless steel, although it should be understood that the invention is not limited to the general shape of the masticator or to the material from which it is made. Each masticator 21 has a body portion with rounded ends 22 and 23 which are each provided with annular recesses 22' and 23'. Each masticator 21 has a plane occlusal face 24 provided with a groove 25 which is preferably of rectangular cross-section and which preferably extends along a diameter of the plane occlusal face 24. The opposite sides of each masticator 21 are concave, preferably circularly concave, to form concave sides 26 and 27. As best seen from Fig. 3 each of concave sides 26 and 27 subtends an angle of more than 90° at the center $c$ of the body portion and the advantages of that construction will be presently explained. Preferably, said concave sides 26 and 27 are symmetrical to an axis passing through said center $c$ through which the axis or center line of the body members also extends. Although said masticators 21 are preferably identical in construction, the upper masticator in Fig. 3 will be designated as 21a, and the parts thereof as 22a, 24a, 26a, 27a, etc.

The manner of mounting the masticators in the teeth will now be described. A hole 28 is drilled into the tooth to carry the masticator and such hole 28 can be drilled with an ordinary drill. Obviously, the hole 28 should be of a diameter slightly greater than the diameter of the masticator across the rounded ends 22 and 23 and said hole 28 should be to a depth such that the plane occlusal face 24 of the masticator will be flush with the occluding surface of the tooth. A plastic cement of standard or commercial composition is placed in the hole 28 and recesses 22' and 23' of the masticator and fills the spaces between the concave sides 26 and 27 and the walls of the hole 28. The excess plastic cement is removed and the remainder smoothed off level with the top or occluding surfaces of the tooth. Upon setting of the plastic cement the masticator is securely and conveniently mounted within the tooth.

As best shown in Fig. 1 the masticators 21 are mounted within the teeth of the lower plate 11 with the grooves 25 therein extending mesio-distally of the teeth whereas the masticators 21 are mounted with the grooves 25 extending bucco-lingually of the teeth of upper plate 10. Also the masticators 21 are mounted in pairs so that the masticator 21 in the lower plate 11 will be in substantial alignment with a masticator 21 in the upper plate 10. Such alignment of the corresponding pairs of masticators may, because of the fact that upper and lower teeth do not naturally come into alignment but are staggered, require that one of the masticators be placed at the juncture between teeth as illustrated by the masticators 21 placed at the junctures between molar 19 and bicuspid 20 on both sides of the teeth in the lower plate 11.

The result of the arrangement of the masticators 21 as shown and described is that the grooves 25 in the adjacent ends of the masticators 21 of a pair are perpendicular, or substantially perpendicular, to each other when the teeth are closed as for chewing or grinding. The primary function of the crossed grooves 25 is to help retain the food in position between the masticators. Also, as shown in Fig. 3, the adjacent edges of the concave sides 26 and 27 of opposed pairs of masticators will provide a shearing or cutting action on food during grinding movement of the teeth. This latter result is primarily obtained by making the concave sides subtend an angle of more than 90° at the center of the masticator but still preferably subtend an angle of less than 170°, the optimum condition being as illustrated or with the concave sides subtending an angle of about 110°.

As shown in Fig. 3, the adjacent concave edges 26 and 26a, 27 and 27a, of respective pairs of masticators according to the invention are spaced from each other when the teeth are closed and the masticators are in alignment. Food retained between the teeth is subjected to a cutting or shearing action regardless of the direction in which the closed masticators move as chewing movement occurs. Clearly concave edges 26 and 26a, 27 and 27a shear the food therebetween and in addition between each of edges 26, 26a, 27, 27a and the opposite edges of the grooves 25a and 25 of the opposite masticators.

From the foregoing description it should now be understood that the masticators according to the invention are extremely effective in assisting the masticating action of false teeth and at the same time eliminate the wear from grinding and chewing on the teeth themselves so as greatly to prolong the life and usefulness of a set of artificial teeth.

Since certain variations of the arrangement and formation of the masticators disclosed are possible without departing from the spirit of the invention, the scope of my invention is not to be limited by the disclosure but is as defined by the claims which follow.

Having now particularly described my invention, what I desire to secure by Letters Patent of the United States and what I claim is:

1. A set of artificial teeth including a lower plate and an upper plate, comprising a pair of dental masticators of material which is hard relative to the artificial teeth and each having plane occlusal faces and mounted respectively in the teeth of said upper and lower plates in substantial alignment so that said plane occlusal faces contact each other when said teeth are in closed position, the occlusal face of the masticator in one plate being provided with a groove extending mesio-distally of said teeth and the occlusal face of the masticator in the other plate being provided with a groove extending bucco-lingually of said teeth whereby said grooves are substantially perpendicular to each other when said teeth are in closed position.

2. A set of artificial teeth including a lower plate and an upper plate, comprising a pair of dental masticators of material which is hard relative to the artificial teeth and each having plane occlusal faces and mounted respectively in the teeth of said upper and lower plates in substantial alignment so that said plane occlusal faces contact each other when said teeth are in closed position, the masticator in one plate having two sides oppositely concave about an axis extending mesio-distally of said teeth and the masticator in the other plate having two sides oppositely concave about an axis extending bucco-lingually of said teeth whereby the concave edges of the respective masticators cooperate to perform a cutting action upon chewing movement of said artificial teeth.

3. A set of artificial teeth including a lower plate and an upper plate, comprising a pair of dental masticators of material which is hard relative to the artificial teeth and each having plane occlusal faces and mounted respectively in the teeth of said upper and lower plates in substantial alignment so that said occlusal faces contact each other when said teeth are in closed position, the occlusal face of the masticator in one plate being provided with a groove extending mesio-distally of said teeth and the occlusal face of the masticator in the other plate being provided with a groove extending bucco-lingually of said teeth, and the masticator in said one plate having two sides oppositely concave about an axis extending mesio-distally of said teeth and the masticator in said other plate having two sides oppositely concave about an axis extending bucco-lingually of said teeth whereby said grooves and the concave edges of the respective masticators cooperate to perform a cutting action upon chewing movement of said artificial teeth.

4. As an article of manufacture, a dental masticator comprising a body portion of material which is hard relative to artificial teeth and of uniform cross-section with respect to a vertical axis, and a plane occlusal face perpendicular to said axis and provided with a substantially straight groove intersecting said axis.

5. As an article of manufacture, a dental masticator comprising a body portion of material which is hard relative to artificial teeth and of uniform cross-section with respect to a vertical axis, a plane occlusal face perpendicular to said axis, and a pair of opposite sides concave with respect to an axis of symmetry substantially coinciding with said axis of said body portion.

6. As an article of manufacture, a dental masticator comprising a body portion of material which is hard relative to artificial teeth and of uniform cross-section with respect to a vertical axis, a plane occlusal face perpendicular to said axis, and a pair of opposite concave sides each subtending an angle of more than 90° at said axis.

7. As an article of manufacture, a dental masticator comprising a body portion of material which is hard relative to artificial teeth and of uniform cross-section with respect to a vertical axis, a plane occlusal face perpendicular to said axis and provided with a substantially straight groove intersecting said axis, and a pair of opposite sides concave with respect to an axis of symmetry and each subtending an angle of more than 90° at the axis of said body portion.

8. As an article of manufacture, a dental masticator comprising a cylindrical body portion of stainless steel and provided with an annular recess, a plane occlusal face perpendicular to the vertical axis of said cylindrical body portion and provided with a groove extending along a diameter of said occlusal face, and a pair of opposite sides circularly concave with respect to an axis of symmetry coinciding with the vertical axis of said body portion and each side subtending an angle of more than 90° at said axes.

References Cited in the file of this patent

UNITED STATES PATENTS 2,397,407    Butler _____ Mar. 26, 1946